April 14, 1959   J. J. BLACK   2,882,088
CONNECTORS FOR REMOVABLE CATTLE RACKS FOR VEHICLES
Filed Sept. 16, 1957   2 Sheets-Sheet 1

INVENTOR.
James J. Black.
BY
Wood, Herron & Evans.
ATTORNEYS.

April 14, 1959    J. J. BLACK    2,882,088
CONNECTORS FOR REMOVABLE CATTLE RACKS FOR VEHICLES
Filed Sept. 16, 1957    2 Sheets-Sheet 2
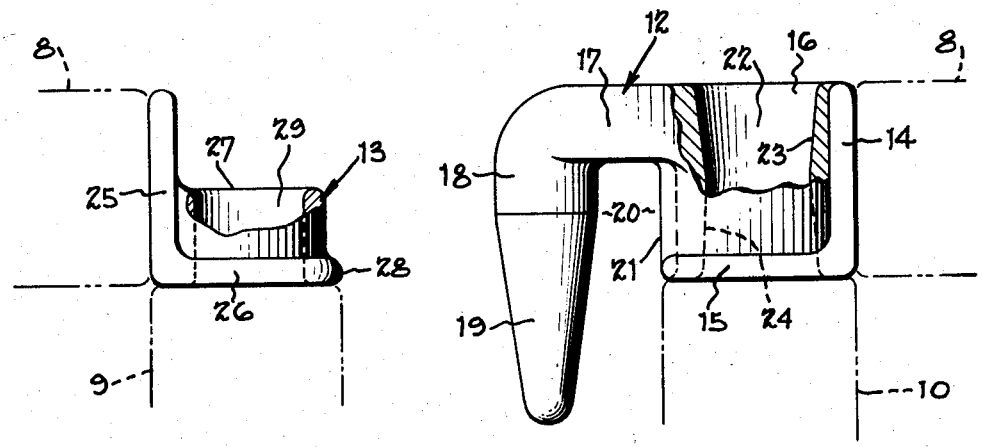
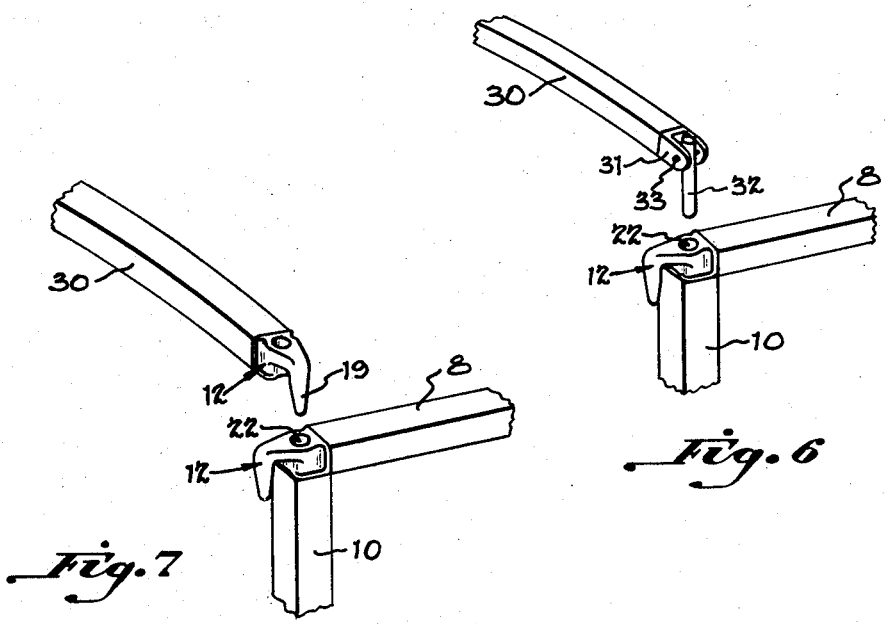
INVENTOR.
James J. Black.
BY
Wood, Herron & Evans.
ATTORNEYS.

2,882,088
Patented Apr. 14, 1959

2,882,088
CONNECTORS FOR REMOVABLE CATTLE RACKS FOR VEHICLES

James J. Black, Cincinnati, Ohio, assignor to Trailmobile Inc., Cincinnati, Ohio, a corporation of Delaware Application September 16, 1957, Serial No. 684,015

6 Claims. (Cl. 296—12)

This invention relates to connecting fixtures of the hook and eye type. More specifically, it relates to hook and eye connectors of a type suitable for linking together the removable side sections, commonly known as "racks," of trailer vehicles such as are in common use for hauling livestock.

The floor or "bed" of the large cattle trailers of today is of elongated rectangular shape, perhaps 40 feet long and 8 feet wide. Removable vertical racks extend upwardly from the two side edges of the beds. Generally, each of the long side walls of the vehicle is subdivided into three or more individual racks, each rack being of the order of 10 to 14 feet long. A rack is comprised of several vertical posts spaced at regular intervals from one another, overlaid with spaced horizontal wooden slats, so that, in appearance, the rack is similar to an open latticework. An open construction for the sides is understandably necessary in trucks to be used in hauling livestock. A horizontal rim piece, comprised by a hollow rectangular sectioned metal bar extends along the top of the rack adjacent to the ends of the vertical posts. At each of the two top corners, this rim meets a vertical corner post of similar construction, the rim and two corner posts thereby constituting a metal boundary for the rack. The rack is affixed to the bed of the trailer by means of several short studs, comprised of the extending lower ends of the vertical posts, spaced so as to register with accommodating sockets in the bed of the truck, in which the studs are held by the action of gravity. Thus, each rack may be removed from the bed simply by lifting it until the ends of the studs come clear of the sockets, so that there is no longer any connection to the bed.

Convenient removability of the racks is desirable from the standpoint of versatility; with the racks in place, the vehicle may be used to haul cattle. With the racks removed, the flat bed may be used for hauling a great variety of heavy or bulky objects.

In order to provide as rigid and sturdy a side for the trailer as is consistent with light weight and easy removability, various means of interconnecting adjacent racks have long been employed, ranging from a simple rope by which the sections are tied together to various sorts of connectors fastened to the racks.

The present invention is an improved hook and eye type connector adapted to be welded at the top corners of the rack to the metal frame which runs around the rack, a hook unit at one corner interlocking with an eye unit at the adjacent corner of the next rack so as to link the racks together and thereby stiffen and rigidify the entire side of the trailer.

Both the hook and the eye are preferably cast and comprise mating pieces constructed for installation at various points as required. Thus, the hook piece of the assembly may be welded into a notch or recess in one top corner of a rack, at the point where the metal top rim and end post meet, while the eye piece may be welded in like fashion into the other corner of the rack for receiving the hook. The plane of symmetry of the hook is fashioned so as to be parallel to the longitudinal plane of the rack when installed, and neither the hook nor the eye protrudes beyond the inside or outside surfaces of the rack. This is advantageous in that any object which does protrude beyond the surface of the rack is likely to be damaged when racks which are not being used are stacked on top of one another.

On the trailer the racks are set in place so that the hook corner of one rack is adjacent to the eye corner of a second rack. When the rack having the eye is seated in place on the trailer, the pin of the hook of the second rack is engaged in the eye of the first rack simultaneously as the studs along the foot of the rack are located in their cooperating sockets. Thus, a rack is fastened to the trailer bed along its bottom edge and is linked to the next rack at its upper adjacent corner by the hook of one and the eye of the other, all in one operation. In the past, after the rack had been seated, the rack-to-rack connections had to be made as a second step. Therefore, a prime advantage of the invention is the facility and speed with which it enables racks to be connected.

As the invention may be used to link parallel racks together along the side of the trailer, so may it be used to hook together two racks which are at right angles to one another, as at the corner of the bed or where intermediate lateral partitions or roof bows are used.

Other objects and further advantages of the invention are disclosed in reference to the drawings, in which:

Figure 4 is a side view, partly broken away, of an eye piece;

Figure 5 is a side view, partly broken away, of a hook piece;

Figure 6 is a perspective view showing use of a hook piece for interconnecting a standard roof bow to a rack; and Figure 7 is a perspective view showing an improved roof bow having a hook rather than a toggle pin, in position to be connected with a hook on a rack.

Figure 1:
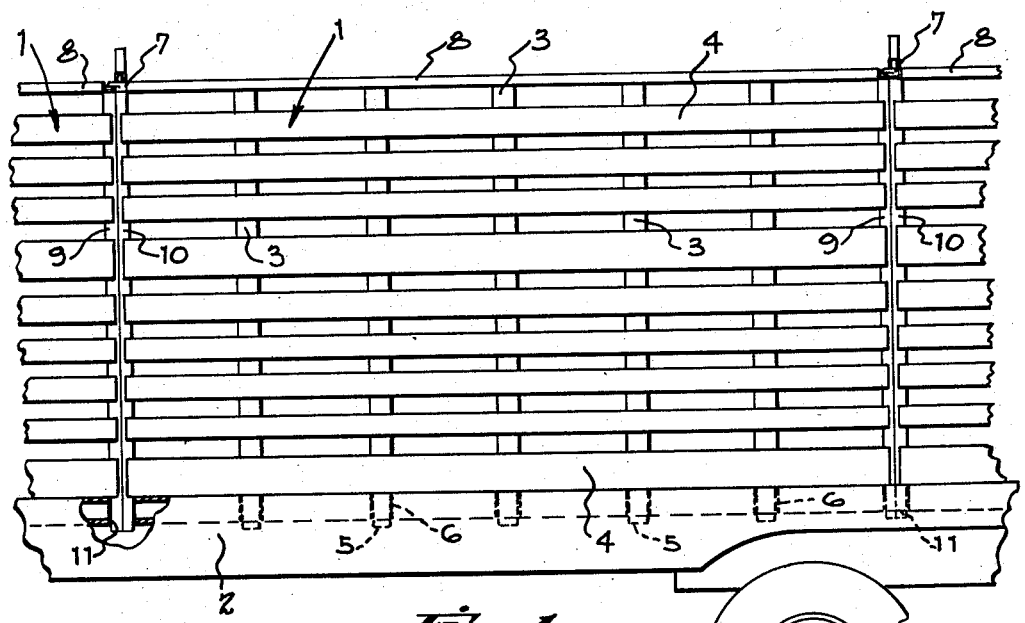
Figure 1 is a partial side elevation of a cattle trailer illustrating the general arrangement of the racks and their relation to the trailer bed and to each other.
Figure 2:
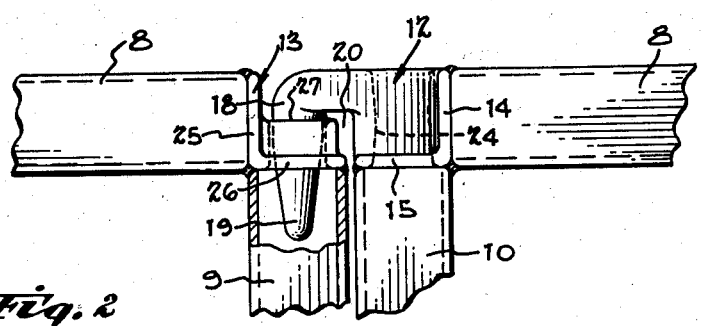
Figure 2 is an enlarged side view, partly broken away, of the upper corner portions of two adjacent racks, illustrating the manner in which the hook and eye pieces of the present invention interact with one another.

The rack of the trailer unit, indicated generally in Figure 1 at 1, extends vertically upward from the trailer bed 2 at the edge of the bed. The rack has spaced vertical posts 3 and horizontal slats 4, the extending lower ends of the posts being tapered so as to form studs 5 which are socketed in cooperating cups 6 provided in the bed 2 of the trailer, for example, along the side rails thereof. The connectors to which this invention is directed link two adjacent racks together at their common upper corners, as at 7 in Figure 1. A metal rim 8 extends along the top of the rack, and metal posts 9 and 10 extend vertically at each end of a rack, the end posts 9 and 10 of two adjacent racks being socketed in the same cup, as at 11. Thus, the present connecting fixtures are particularly useful as fasteners at the top corners of a rack, where the top rim 8 meets the end posts 9 and 10.

The units constituting the invention consist of two interlocking parts, a hook piece indicated generally in the drawings at 12, and an eye piece indicated generally at 13. Both parts are integral castings, preferably of steel or cast iron.

The hook piece 12, as is best shown in Figure 5, has a right angular bracket portion constituted by a vertical buttressing wall 14 and a horizontal base 15. A body portion 16 is seated in the internal corner of the bracket portions 14 and 15 and is coextensive with those portions. An elongated tongue 17 projects forwardly from the top portion of the body 16 of the hook. Depending from the outer or forward end of the tongue 17 is a vertical shank 18 terminating in a long tapered pin 19, the lower end of which extends beyond the plane of the base 15, a recess 20 thereby being formed between pin 19 and the concave face 21 of the body adjacent the pin. A bore 22 extends vertically downward through body 16 of the hook between the inward end of the tongue 17 and the buttressing wall 14, the bore having an inwardly tapered top entrance 23 and an oppositely or outwardly tapered bottom exit 24.

The buttressing wall 14 is adapted to be welded to the end of the horizontal top rim 8 of the rack, and the base 15 of the hook is adapted to be welded to the top end of the vertical end post 10 of the rack. The hook thus occupies a recess or notch at the corner where the rim and post come together. As is evident from the drawings, the hook, being welded to both the rim and the post, rigidifies the entire rack by interconnecting those two members to one another. Thus, the first function of the hook piece is as a corner bracket. Its other functions are later described.

The eye piece 13, as is best shown in Figure 4, also has a right angular bracket portion constituted by a back flange 25 and a base flange 26 at right angles thereto. A cylindrical boss 27, reinforced by a base flange bead 28, is seated on the base flange 26, the boss 27 terminating below the top of the back flange 25. A vertical hole 29 extends through the boss 27, the diameter of this hole being slightly greater than the diameter of the shank 18 of the hook piece, so that the pin 19 and shank may be easily received by the hole 29. The distance from the axis of the hole 29 across the bead 28 is less than the distance from the axis of pin 19 to the concave face 21 of the hook piece 12 so as to permit the eye piece to be rotated in a horizontal plane about the axis of the pin when the hook and eye are joined. The eye is connected to a rack in a fashion similar to that in which the hook is connected. The back 25 is welded to the other end of the top rim 8 of the rack, and the base 26 is welded to the vertical post 9 of the rack, adjacent to the rim 8, acting as a bracket by which those members are connected together at the corner.

In the preferred utilization of these members, each rack is provided with an eye at one of its two top corners and with a hook at the other top corner. In setting up the racks on a trailer, a first rack is secured to the bed of the trailer by the above-mentioned interlocking studs 5 and sockets 6 or by other means. A second rack is then positioned above its cooperative trailer bed mountings and is so placed relative to the first that the hook on the second rack is adjacent to the eye of the first. In racks of a preferred construction such as that shown in Figure 1, the width of the end posts 9 and 10 is just half that of the intermediate posts 3 so that both the end post 9 of the first rack and the end post 10 of the second rack can be socketed in the same cup 6 in the bed, as at 11. With this arrangement the first rack can be positioned at any longitudinal position since all the cups are alike, i.e., there need be no specially shaped end post cups.

The pin 19 of the hook is then inserted into the hole 29 of the eye and slipped down the hole so that the shank 18 is held within the hole while simultaneously the studs of the rack are socketed in the cups 6 in the bed of the trailer. Then the post 10 of the second rack is adjacent to the post 9 of the first, and the two racks are linked together at their adjacent top corners by the interlocking hook and eye. The end posts in use today are usually of hollow, generally rectangular section, so that the pin 19 may extend through the hole 29 of the eye, past the base-to-post weld, into the interior of the post 9. The taper of the pin 8 acts to center the pin within the hole 29 so that an easy sliding coupling is contemplated. Additional racks may be connected in like manner, hook within eye, and so on, along the length of the bed.

The invention is also employed to advantage in coupling two racks together at a corner, as at the back or front end of the bed. As is evident from Figure 3, the tongue 17 spaces the pin 19 from the body 16 a distance sufficient to permit the eye to be so positioned relative to the hook that the planes of their respective back walls are at right angles, or at any lesser angles, to one another rather than being parallel as they were in the above-described attitude. Likewise, partitions subdividing the bed of the trailer may be linked to the side racks by means of the invention. It is of the essence that the hook and eye will interlock regardless of the relative locations of the planes of their racks to one another, provided the internal angle is greater than a certain minimum depending on the length of the tongue and the size of the bases of the hook and eye.

The bore 22 in the body 16 of the hook not only reduces weight but is additionally advantageous. Often it is desirable to link the side racks of the trailer together at spaced transverse points for extra rigidity. This is done by means of a bowed metal roof bar 30, such as shown in Figure 6, extending at right angles to one rack across the bed of the trailer, over to the corresponding rack on the other side of the bed. At each end of the standard roof bar 30 is a clevis 31 with a toggle pin 32 connected thereto by a clevis pin 33. The diameter of the toggle pin 32 is just slightly less than the diameter of the bore 22 in the hook, so that the toggle may be inserted into that hole, thereby linking the roof bar to the sides. Thus, the roof bar extends transversely between corresponding hooks on the side racks. An improved roof bar is shown in Figure 7. This has a standard hook unit 12 welded onto its end section, rather than the clevis arrangement shown in Figure 6. The pin 19 of the hook will fit into the bore 22 of the rack hook. The clevis, replaced by the hook, is eliminated entirely.

Figure 3:
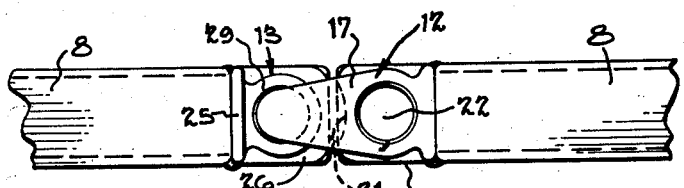
Figure 3 is a top view of the connector shown in Figure 2.

It is evident from Figure 3 that the hook and eye, when properly welded to the racks, do not project beyond the general plane of the side of the rack. The benefit in this is that the racks may be compactly stacked, when not in use, one facially on top of another with no danger that the connectors will break off or become damaged as they otherwise might. Racks are usually heavily made, as they must be to withstand their hard usage, and when one is slid over another in stacking them, there has heretofore been considerable damage done to old type connectors which extended beyond the plane of the side of the rack. The invention eliminates this.

For low-cost manufacture, the hooks and the eyes may be cast in multiples of as many as ten units, these units being serially connected with gates or runners between them. Casting them in this way reduces the per unit cost. The units may be separated from the series by punching or sawing out the runners.

Having described my invention, I claim:

1. Hardware for use in the fabrication of racks for trailer vehicles, said hardware comprising hook and eye pieces adapted for interconnection with one another, each of said pieces comprising a bracket portion presenting surfaces arranged at right angles to one another, the said surfaces respectively being adapted to be buttressed against and welded to the ends of structural members of a rack, the said eye piece, at the inside corner of the bracket portion thereof, having a boss seated on one portion of the bracket and terminating below the top of the other portion of the bracket, the said boss containing a central eye hole, the said hook piece, at the interior corner of the said bracket thereof, having a body portion substantially coextensive with the edges of said bracket portion thereof, said body portion containing an eye hole passing through said bracket portion and the said body also having a lateral projection and a hook portion depending therefrom below the body and spaced therefrom for reception in the eye hole of said eye piece, the lower surface of said lateral projection of said hook piece being adapted for abutment with the upper surface of the boss of said eye piece when the two are mated.

2. Hardware for use in the fabrication of racks for trailer vehicles, said hardware comprising hook and eye pieces adapted for interconnection with one another, each of said pieces comprising a bracket portion presenting surfaces arranged at right angles to one another, the said surfaces being adapted to be buttressed against and welded to the ends of structural members of a rack, the said eye piece having a boss seated on one of said right angular portions at the inside corner of the bracket, said boss terminating below the height of the other right-angular portion of the bracket, the said boss having a central hole formed therein which extends through the boss and the portion upon which the boss is seated, the hook piece having a body portion substantially coextensive with the edges of said bracket portion thereof at the interior corner of the said bracket, said body portion containing an eye hole passing through said bracket portion and the said body also having a tongue projecting laterally from the top of said body opposite said interior corner, a pin portion depending therefrom and extending below said right-angular portion and spaced from said body for reception in the eye hole of said eye piece, the lower surface of said tongue being adapted for abutment with the upper surface of the boss of said eye piece when the two are mated, the face of said hook body adjacent to said pin being concave to permit said eye portion to be rotated about said pin when engaged therewith.

3. A removable rack for a trailer comprising, a peripheral frame consisting of a vertical post at each end and a horizontal rim extending along the top of said rack, an interior portion consisting of a latticework of crossing posts and slats terminally attached respectively to said rim and end posts, the lower ends of said posts forming studs projecting downwardly below said latticework and adapted to be received in cooperative cups formed in the bed of the trailer, a hook unit having a back and a base, said back being welded to one end of said rim and said base being fastened to the adjacent end post at one of the two top corners of the rack, thereby acting as a bracket structurally uniting said post and rim, said hook unit having a body disposed between said back and base, a tongue projecting therefrom and a pin depending from the outward end of said tongue, and an eye unit having a base and a back at right angles, said base and back being welded respectively to the ends of the post and rim at the opposite end of said rack, said eye having a boss between said base and back presenting a central hole adapted to receive the pin of a similar hook unit of an adjacent rack whereby the pin of one rack may be interfitted with the hole of an eye on a rack adjacent to it to lock the proximate top corners of the two racks together.

4. The rack of claim 3, the body of said hook having a hole extending vertically therethrough, said hole being adapted to receive a toggle pin depending from one end of a roof bow member extending transversely across the trailer uniting corresponding racks on opposite sides of the trailer.

5. An article of manufacture adapted for coupling together removable racks mounted on a cattle vehicle comprising, a hook piece and an eye piece, said hook piece having a right-angular bracket portion, a body disposed between the two flanges of said bracket and coextensive with said flanges, a tongue projecting away from said bracket at the top of said body, a tapered pin depending from the outer end of said tongue beyond the plane of one of said flanges, the face of said body adjacent the pin being concave, a recess thereby being presented between said pin and said concave face, said eye piece having a right-angular bracket portion, a boss disposed between the two flanges of said bracket, said boss being generally coextensive with one of said flanges and terminating short of the top edge of the other, and said boss presenting a hole vertically therethrough, the diameter of said hole being greater than the diameter of said pin, whereby the hook piece fastened to one end of a rack is adapted to interlock with the eye piece fastened at the relatively opposite end of an adjacent rack.

6. Side structure for a trailer vehicle having a base presenting sockets at spaced intervals along its sides, said side structure comprising a plurality of stake side sections of substantially duplicate size, each section comprising respective end posts which are spaced for reception in said sockets and which are of such size that an end post of one section may be received in a socket alongside an end post of an adjacent section and each thereby becomes sustained in said socket, and means for interlocking the top portions of the adjacent end posts of adjoining sections whereby the socketed end posts act as a single stake to increase the stability of the side structure.

References Cited in the file of this patent
UNITED STATES PATENTS

| | | |
|---|---|---|
| 764,278 | Donovan | July 5, 1904 |
| 1,511,728 | Howland | Oct. 14, 1924 |
| 2,548,189 | Armstrong | Apr. 10, 1951 |